United States Patent [19]

Yamada et al.

[11] 4,263,261

[45] Apr. 21, 1981

[54] METHOD FOR THE REMOVAL OF IMPURITIES FROM SODIUM ALUMINATE SOLUTION

[75] Inventors: Koichi Yamada; Takuo Harato; Hisakatsu Kato, all of Niihama, Japan

[73] Assignee: Sumitomo Aluminium Smelting Company, Limited, Osaka, Japan

[21] Appl. No.: 103,349

[22] Filed: Dec. 13, 1979

[30] Foreign Application Priority Data

Dec. 21, 1978 [JP] Japan .................................. 53/158935
Feb. 13, 1979 [JP] Japan ....................................54-15792

[51] Int. Cl.$^3$ ................................................ C01F 7/06
[52] U.S. Cl. ..................................... 423/121; 423/130; 423/600; 423/127; 23/301
[58] Field of Search ............... 423/119, 121, 130, 600; 23/301

[56] References Cited

U.S. PATENT DOCUMENTS 3,649,185  3/1972  Sato et al. ............................ 423/121
3,899,571  8/1975  Yamada et al. ...................... 423/127

*Primary Examiner*—Herbert T. Carter

*Attorney, Agent, or Firm*—Stevens, Davis, Miller & Mosher

[57] ABSTRACT

Impurities such as organic substances, i.e. sodium oxalate and inorganic impurities, i.e. sodium salts of vanadium and phosphorus or double salts containing the latter sodium salts are removed from a sodium aluminate solution in the production of alumina from bauxite according to the Bayer process by adding sodium oxalate crystals or both sodium oxalate crystals and at least one of sodium salts of vanadium and phosphorus, or double salts containing the latter sodium salts as seed to the sodium aluminate solution in the course of after the precipitation step of aluminum hydroxide to before the digestion step, thereby precipitating crystals of said impurities, separating the crystals of said impurities from the sodium aluminate solution, dissolving about 10 to 50% by weight of the amount of the newly precipitated organic substances from the separated crystals of said impurities in an aqueous unsaturated sodium oxalate solution, and recyclically using the crystals resulting from the dissolution together with the resulting solution as seed for the precipitation of the impurities in the sodium aluminate solution. The impurities can be simply and effectively removed.

10 Claims, 2 Drawing Figures

METHOD FOR THE REMOVAL OF IMPURITIES FROM SODIUM ALUMINATE SOLUTION

The present invention relates to a method for the production of alumina from bauxite by the Bayer process or improved processes thereof (hereinafter inclusively referred to as the Bayer process). More particularly, the invention relates to a method for the efficient removal of organic substances such as sodium oxalate, etc., or the organic substances and inorganic substances such as vanadium, phosphorus, etc. in the sodium aluminate solution in the method for the production of aluminua from bauxite by the Bayer process.

As is well known, the production of alumina by the Bayer process comprises the steps of treating bauxite with a hot alkali solution at a temperature generally above 130° C. to extract the alumina portions contained in the bauxite (the digestion step); separating undissolved residues such as iron oxide, silicates, titanium oxide, as red mud, etc. from the resulting slurry (the red mud sedimentation step); adding aluminum hydroxide as seed to the clarified sodium aluminate solution after the separation of the undissolved residues (hereinafter referred to as the Bayer solution); precipitating aluminum hydroxide at a temperature generally of 50° to 70° C., and separating the precipitated aluminum hydroxide from the sodium aluminate solution (the precipitation step); and recycling a portion of the separated aluminum hydroxide precipitate as seed to the precipitation step and withdrawing the remaining portion of aluminum hydroxide precipitate as a product, while recycling the sodium aluminate solution after separating aluminum hydroxide precipitate (hereinafter referred to as the spent liquor), as it is or after evaporation, to the digestion step for bauxite.

Generally, the bauxite contains organic substances mainly comprised of humus and inorganic substances such as vanadium, phosphorus, etc. as impurities, and these impurities dissolve, as such or as soluble salts, in the sodium aluminate solution in the degestion step for bauxite. Consequently, the impurities are gradually accumulated in the recycling sodium aluminate solution of the Bayer process.

The organic substances in the Bayer solution are present in various forms of from humus to final decomposition products thereof, for example, sodium oxalate (hereinafter referred to as sodium oxalate representatively), and the inorganic impurities such as vanadium, phosphor, etc. are present as sodium satls thereof. In the conventional Bayer process, these impurities having a low solubility in the sodium aluminate solution precipitate as crystals or as absorbed to the surface of precipitated aluminum hydroxide, in the precipitation step where the solution is maintained at a low temperature for a long time, but in that case the precipitated aluminum hydroxide cannot be separated from the crystals of the impurities, and thus the impurities are accumulated and contained in the aluminum hydroxide to be recycled as seed to the precipitation step thereby preventing the growth of aluminum hydroxide crystal, and consequently making the production of aluminum hydroxide precipitate having a large grain size impossible, or further the impurities contaminate aluminum hydroxide precipitate withdrawn as product, thereby lowering the purity of the product.

A method for the removal of organic substances such as sodium oxalate, etc. from the sodium aluminate solution in the Bayer process, which comprises adding sodium oxalate crystals as seed to the spent liquor to be cooled after the precipitation and separation of aluminum hydroxide precipitate, thereby precipitating sodium oxalate has been so far well known (Japanese Patent Publication No. 398/78), but said method has such a disadvantage that the functions of sodium oxalate crystals as seed, that is, the effect of preventing formation of sodium oxalate crystal having a fine grain size and the effect of promoting the precipitation rate of the organic substances such as sodium oxalate, are lost during the recycling use of the seed crystals.

To overcome said disadvantage, a method comprising adding sodium oxalate crystals to the sodium aluminate solution or the spend liquor as seed in the course from the precipitation step of aluminum hydroxide precipitate to the digestion step, thereby precipitating the organic substances in the solution, then separating the crystals from the sodium aluminate solution, washing the separated crystals with an aqueous solution having PH of 5 to 12, thereby washing off a substantial amount of the organic substances newly deposited on the seed from the separated crystals, and recycling the sodium oxalate crystals after the substantial amount of the organic substances newly deposited on the seed have been washed off as seed for precipitating the organic substances has been proposed (Japanese Patent Publication No. 400/78; U.S. Pat. No. 3,899,571). Said method is very distinguished in recovery and regeneration of the functions of the seed sodium oxalate as seed, but the operation of washing off the substantial amount of organic substances newly deposited on the seed requires a large-scale apparatus for the solid-liquid separation when industrially carried out, and thus said method is not always economical when an incorporation of said method into the commercialized Bayer process in operation is taken into account. Furthermore, the concentration of organic substances in the spent liquor, which is treated in a precipitation tank, for the removal of organic substances, changes with the procedure of the digestion step, depending upon the content of organic substances contained in the raw material bauxite, operating conditions, etc., and thus an amount of organic substances deposited on the seed also changes, necessitating a highly skillful operating technique.

In that case, a continuous inspection of the concentration of organic substances in the spent liquor introduced into the precipitation tank for the removal of organic solution, a continuous measurement of the weight of precipitated substances and a follow-up control of the amount of washing liquid for washing off organic substances newly deposited on the seed on the basis of these inspection or measurement results can be conceived as a method for washing off the substantial amount of the organic substances newly deposited on the seed in accordance with a fluctuation in the amount of precipitated organic substances due to the concentration of organic substances in the spent liquor introduced into the precipitation tank, but said method requires not only a complicated and very high technique of changing the amount of washing liquid in view of the inspection or measurement results, but is also not economical. Thus, in the industrial scale operation, a method comprising determining an amount of organic substances newly deposited on the seed in a stationary state and predetermining an amount of washing liquid for washing off the organic substances deposited on the seed on the bases of the determined amount has been employed. However, when the amount of precipitated organic substances is smaller than the predetermined amount due to a variation in the concentration of organic substances in the Bayer process, as described above, excessive washing is carried out in said method, and consequently the recycling seed crystals having a fine grain size are dissolved in the washing liquid and disappear, and the weight of recycling seed and number of grains are unbalanced. That is, the surface area of the seed is acceleratingly reduced, though generation of fine grains (nucleus generation) can be eliminated. Thus, the precipitation rate of organic substances is lowered in the precipitation procedure as a disadvantage. To compensate it under the present situation, fresh sodium oxalate seed is added thereto from the outside as soon as such as phenomenon as the lowering in the precipitation rate appears, thereby adjusting the seed balance.

Furthermore, a method for simultaneously removing the impurities of organic and inorganic substances from the sodium aluminate solution has been proposed, which comprises adding sodium salts of vanadium, phosphorus, etc. as seed to the spent liquor to be cooled after the precipitation and separation of aluminum hydroxide precipitate, thereby removing the impurities of vanadium, phosphorus, etc. in the liquor, while adding sodium oxalate crystals as seed thereto, thereby precipitating and removing the organic substances such as humic acid, sodium oxalate, etc. in the liquor at the same time (for example, Japanese Patent Publication No. 10120/77).

The simultaneous removal of the inorganic and organic substances is simple in operation and economical, because the step for removing the impurities present in the spent liquor is a single operation, as compared with the method for individually removing the respective impurities, but has such serious defects that the functions as seed, that is, the effect of preventing formation of sodium oxalate crystal having a fine grain size and the effect of accelerating the precipitation rate of the organic substances such as sodium oxalate, are lost while recyclically using, among others, the sodium oxalate cyrstals as the seed, and particularly has such a fatal defect in an industrial scale practice that the formation of sodium oxalate crystal having a fine grain size makes the settling and filtration difficult, necessitating very large equipment.

To overcome said detects, a method has been proposed (said Japanese Patent Publication No. 400/78; U.S. Pat. No. 3,899,571). Said method is effective for removing organic substances alone from the sodium aluminate solution, that is, effective for the removal of the impurities in a system of adding no sodium salt crystals of vanadium, phosphorus, etc. as seed for the removal of inorganic substances, but is not effective for the simultaneous removal of the inorganic and organic substances, because the amount of inorganic and organic substances to be accumulated in the Bayer process depends upon the kinds of bauxite as a raw material or operating conditions, and thus the substantial amounts of the organic substances and the inorganic substances newly deposited on the respective seeds by the addition of the seed are also varied. Thus, the substantial amounts of the respective organic substances and inorganic substances deposited on the seed cannot be removed according to the method for washing the precipitates. For example, when the substantial amount of the precipitated organic substances to be newly deposited on the seed is removed by washing, the amount of the crystals of inorganic substances as seed will be inevitably in excess or shortage during the course of washing and recycling use of the seed. When the amount of seed is in shortage, the functions of the seed are reduced, and fresh seed must be added to the system from the outside, whereas when the amount of seed is in excess, only the crystals of inorganic substances must be discharged to the outside of the system. These are the inconveniences of said method.

Under these situations, the present inventors have made extensive studies of a method for removing organic substances from a sodium aluminate solution simply and economically in apparatus and operation in an industrial scale practice without reducing the seeding functions of the seed sodium oxalate to be recyclically used and without adding any fresh sodium oxalate seed from the outside of the system in the method for removing the organic substances by the addition of seed sodium oxalate, and furthermore have made extensive studies of a method for removing organic substances and inorganic substances from a sodium aluminate solution simply and economically in apparatus and operation in an industrial scale practice without adding any fresh seed from the outside of the system, without discharging only the crystals of inorganic substances to the outside of the system while balancing the weight and number of the seed crystal to be recyclically used, and without losing the seeding functions of the seed in the method for simultaneously removing the organic substances and the inorganic substances. As a result, the present inventors have found that said objects can be all satisfied by dissolving a specified amount of organic substances newly precipitated in the step of precipitating the crystals of organic substances or the crystals of both organic substances and inorganic substances in a suitable washing liquid, and recyclically using the resulting solution together with the washed and partially dissolved crystals as seed, and have established the present invention.

That is, the present invention provides a method for the removal of impurities from a sodium aluminate solution in the production of alumina from bauxite in accordance with the Bayer process or improved processes thereof, characterized by adding sodium oxalate crystals or both sodium oxalate crystals and at least one of sodium salts of elements selected from vanadium and phosphorus, or double salts containing said sodium salts of elements selected from vanadium and phosphorus as seed to the sodium aluminate solution during the time period extending from after the precipitation step to before the digestion step, thereby precipitating crystals of organic substances or both crystals of organic substances and crystals of inorganic sodium salts of vanadium, phosphorus, etc. as impurities in the sodium aluminate solution; separating the crystals from the sodium aluminate solution; dissolving about 10 to 50% by weight of the amount of the newly precipitated organic substances from the separated crystals in an aqueous unsaturated sodium oxalate solution; and then recyclically using the crystals resulting from said dissolution together with the resulting solution as seed for the precipitation of the organic substances or both the organic substances and the inorganic substances in the sodium aluminate solution.

The present method will be described in detail below.

According to the present invention, the removal of organic substances such as sodium oxalate, etc., or both the organic substances and inorganic substances of vanadium, phosphorus, etc., which may be hereinafter referred to as "impurities" on the whole, is carried out by adding sodium oxalate crystals or both the sodium oxalate crystals and sodium salt crystals of vanadium, phosphorus, etc. as seed to the spent liquor or the sodium aluminate solution resulting from the precipitation and separation of aluminum hydroxide from the Bayer solution (the precipitation step) after it is evaporated or cooled or after an application of any proper treatment for the spent liquor to bring the impurities in the spent liquor into a supersaturated state.

Usually, the addition of seed crystals is carried out after the degree of supersaturation of sodium oxalate in the spent liquor is adjusted to 0.02 or higher, preferably 0.05 or higher, and after the degree of supersation of at least one of vanadium and phosphorus in terms of element is adjusted to 0.02 or higher, preferably 0.05 or higher.

Since the equilibrium concentration of the impurities in the spent liquor or the sodium aluminate solution is decreased with increasing concentration of soda, it is advantageous that the concentration of soda in the spent liquor is higher, and thus it is advantageous to add the seed crystals to a spent liquor, whose soda concentration is particularly preferably 100–300 g/l in terms of $Na_2O$ after evaporating or cooling of the spent liquor resulting from the precipitation step of aluminum hydroxide, thereby precipitating the organic substances such as sodium oxalate, etc., or both the organic substances and inorganic substances of vanadium, phosphorus, etc. in the spent liquor.

In carrying out the present invention, it is not always necessary to treat all the amount of the spent liquor or recycling sodium aluminate solution, but only a portion of the spent liquor may be subjected to the treatment.

The amount of seed sodium oxalate crystals to be added to the spent liquor or recycling sodium aluminate solution is generally about 10% by weight or more, preferably about 30–3,000% by weight, on the basis of sodium oxalate dissolved in the spent liquor. If the amount of seed sodium oxalate crystals is less than 10% by weight, the effect of adding the seed crystals is small, and undesirable. The upper limit of the amount of the seed sodium oxalate crystals to be added is determined in view of the economy.

The amount of the sodium salt of elements selected from vanadium and phosphorus, its double salts, or their mixture to be added to the spent liquor is generally about 30% by weight or more, preferably about 50–50,000% by weight, on the basis of the total of the vanadium and phosphorus dissolved in the spent liquor. If the amount of the sodium salt, or its double salt, or their mixture to be added is less than 30% by weight, the effect of the addition is small, and undesirable. The upper limit of the amount to be added is determined in view of the economy. When an aqueous solution of the sodium salt, or it double salts, or their mixture is added as seed into the precipitation procedure of dissolved impurities, it is desirable to add the seed solution adjusted to the degree of supersaturation to 0.5 or higher, preferaby 1 or higher.

According to the present method, the precipitation of the impurities is carried out at a temperature of, generally, 0°–75° C., preferably 2°–60° C. However, since the equilibrium concentration of organic substances or both organic substances and inorganic substances in the spent liquor is decreased with lowering temperature, it is advantageous to use a low temperature. The spent liquor after the addition of the seed crystals is stirred generally for 10 minutes or more, preferably for 30 minutes to 10 hours. As a modified method of the impurity removal, the seed crystals can be stepwisely added to the spent liquor or the recycling sodium aluminate solution during the precipitation treatment for impurities.

The concentration of impurities in the spent liquor or sodium aluminate solution is lowered down to almost the equilibrium concentration by the addition of seed crystals, and it has been confirmed that the impurities precipitate as deposited on the seed crystals and as new crystals.

After the precipitation of the impurities in the spent liquor solution as deposited on the seed crystals and new crystals, these crystals of impurities are separated from the sodium aluminate solution according to the well known procedure for solid-liquid separation such as settling, filtration, centrifugal separation, etc.

The crystals of impurities thus separated by the solid-liquid separation are then subjected to a treatment for recovering the function as seed. That is, a portion of the impurities precipitated as deposited on the seed and as newly generated crystals is dissolved.

In the dissolution treatment of the present invention the separated crystals of impurites can be treated in such a manner that the amount of the separated crystals of impurities corresponding to the total amount of the newly precipitated crystals of impurites is divided out in a crystalline form in advance and discharged to the outside of the system, whereas only the remaining portion, that is, the amount of the separated crystals of impurities corresponding to that of the seed crystals initially introduced into the precipitation tank for separating the impurities present in the spent liquor, is subjected to the dissolution treatment and can be recyclically used in a slurry state as need, or in such a manner that a portion of the total amount of the newly precipitated impurities is divided out in a crystalline state in advance and discharged to the outside of the system, whereas the remaining portion thereof is subjected to the dissolution treatment, and then the impurities in excess are removed so that the weight of seed for recycling can meet the predetermined amount, and then the remaining crystals of the predetermined amount can be recyclically used in a slurry state as seed.

Furthermore, the separated crystals of impurities can be treated in such a manner that the separated crystals of impurities are dissolved in an aqueous unsaturated sodium oxalate solution in such an amount as to dissolve about 10–50% by weight of the amount of newly precipitated organic substances among the crystals, then the amount of slurry corresponding to the amount of the newly precipitated organic substances is discharged in a slurry state to the outside of the system, whereas the remaining portion can be recyclically used as seed.

In the present invention for removing the organic substances from the spent liquor or the solium aluminate solution, the dissolution treatment of newly precipitated impurities from the recycling seed sodium oxalate is to regenerate the recycling seed sodium oxalate crystals having no more function as seed owing to other organic substances deposited on the seed sodium oxalate crystals, than the sodium oxalate, and furthermore is to make the nuclei partially generated by the addition of seed grow as seed, and also to provide the recycling seed sodium oxalate causing no deterioration of filtration characteristic and precipitation efficiency due to the generation of a large amount of fine grains. About 10–50%, preferably about 15–35% by weight of the amount of the organic substances newly precipitated on the seed sodium oxalate crystals is dissolved.

If the amount of the organic substances dissolved from the newly precipitated ones on the seed sodium oxalate crystals to be subjected to the dissolution treatment is less than 10% by weight, the recovery of seed function is hardly attained, and a large amount of sodium oxalate crystals having a fine grain size is generated, making the filtration-separation after the precipitation of impurities difficult.

If the amount of the organic substances to be dissolved from the newly precipitated ones on the seed sodium oxalate crystals exceeds 50% by weight, the number of seed crystals is decreased during the recycling use, because it seems that the new generation of sodium oxalate crystals is suppressed or the newly generated sodium oxalate crystals are almost dissolved in the washing liquor in course of dissolution of newly precipitated impurities and consequently the population balance of crystals cannot be maintained in a proper pattern for of fluctuation in the process and operation, and the seed sodium oxalate crystals become coarse, and the precipitation rate of impurities is considerably lowered. In order to obtain a satisfactory precipitation rate of impurities in accordance with a fluctuation in the concentration of sodium oxalate in the spent liquor, it is necessary to add fresh sodium oxalate crystals as seed from the outside of the system. This is not preferable.

The present method for simultaneously removing the organic substances and inorganic substances is to regenerate the seed sodium oxalate crystals having no more function as seed owing to other organic substances deposited on the simultaneously existing seed sodium oxalate crystals, than the sodium oxalate, without lowering the function as seed of the sodium salt crystals of vanadium, phosphorus, etc., and furthermore is to provide the recycling seed crystals causing no deterioration of filtration characteristic and precipitation efficiency due to the generation of a large amount of fine grains without losing all the nuclei generated by the addition of seed by dissolution, while making a portion of the generated nuclei grow as seed.

About 10–50%, preferably about 15–35%, by weight of the amount of organic substances newly precipitated on the seed sodium oxalate crystals among the recycling seeds is dissolved.

If the amount of the organic substances dissolved from the newly precipitated ones on the seed crystals to be subjected to the dissolution treatment is less than 10% by weight, the recovery of function as seed is hardly attained, and a large amount of sodium oxalate crystals having a fine grain size is generated, making the filtration-separation after the precipitation of these impurites difficult.

If the amount of the organic substances to be dissolved from the newly precipitated ones on the seed crystals exceeds 50% by weight on the other hand, the number of seed crystals is decreased during the recycling use, because it seems that the new generation of sodium oxalate crystals is suppressed or the newly generated sodium oxalate crystals are almost dissolved in the washing liquor in course of dissolution of newly precipitated impurities, and consequently the population balance of crystals cannot be maintained in a proper pattern for a fluctuation in the process and operation, and the seed sodium oxalate crystals become coarse, and the precipitation rate of impurities is considerably lowered. In order to obtain a satisfactory precipitation rate of impurities in accordance with a fluctuation in the concentration of sodium oxalate in the spent liquor, it is necessary to add fresh sodium oxalate crystals as seeds from the outside of the system. This is not preferable.

As a washing liquid for dissolving the newly precipitated impurities to be deposited on the seed crystals, an aqueous unsaturated sodium oxalate solution, for suitable example, a dilute sodium aluminate solution unsaturated with sodium oxalate in the Bayer process, or water, is used.

The expression "the organic substances newly precipitated on the seed crystals" herein employed means the organic substances newly deposited on the seed sodium oxalate crystals and/or inorganic crystals, and the organic substances newly generated as crystals.

Dissolution of the organic substances on the seed crystals is carried out generally at a temperature of not higher than 100° C., preferably at room temperature to 60° C.

As the procedure for the dissolution, the one based on dipping the separated crystals of impurities in an aqueous unsaturated sodium oxalate solution can be mentioned, but any procedure can be employed, so long as it can attain the object of the present invention.

The regenerated seed crystals obtained by dissolving about 10–50% by weight of the amount of the organic substances newly precipitated on the seed crystals are recyclically used as seed for the precipitation and separation of the impurities from the sodium aluminate solution. When the organic substances newly precipitated on the seed crystals are dissolved in the simultaneous removal of the organic substances and inorganic substances, a portion of the inorganic crystals of vanadium, phosphorus, etc. is naturally dissolved, and thus the resulting solution must be recyclically used together with the seed crystals on account of the weight balance of the seed.

The regenerated seed crystals thus obtained can fully act as seed, and can be used in the process without supplementing fresh seed crystals from the outside of the system or without separately discharging only the inorganic crystals to the outside of the system.

One embodiment of the present invention will be described below, referring to the accompanying drawings, in which.

Figure 1:
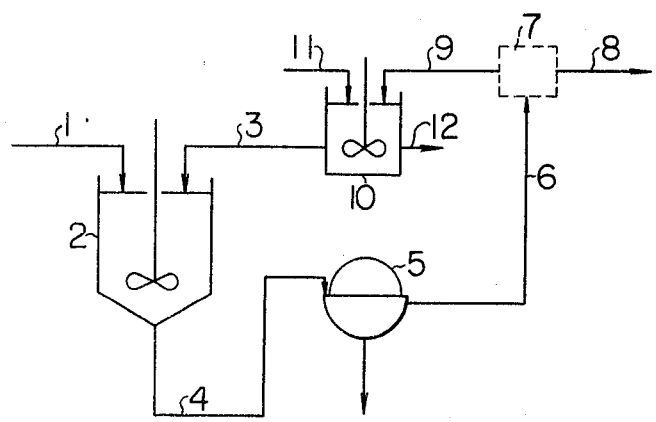
FIG. 1 is a flow sheet schematically showing the precipitation step for organic substances and inorganic substances from a sodium aluminate solution and the dissolution step for seed crystals according to the present invention.

In FIG. 1, a sodium aluminate solution containing organic substances or both organic substances and inorganic substances as impurities from the precipitation step for aluminum hydroxide (not shown in the drawing) is introduced into a precipitation tank 2 for separating the organic substances such as sodium oxalate, etc., or both the organic substances and inorganic substances such as vanadium, phosphorus, etc. through a conduit 1. The precipitation step for removing these impurities is comprised of one or a plurality of precipitation tanks provided with a stirrer, and the introduced sodium aluminate solution, after addition of seed crystals from a conduit 3, is retained in the precipitation tank, for example, for about 30 minutes to 10 hours under stirring to make the organic substances or both the organic substances and inorganic substances in the sodium aluminate solution precipitate as deposited on the seed crystals and as new crystals.

The precipitated crystals of organic substances or both organic substances and inorganic substances in a slurry state are introduced into a filter 5 through a conduit 4 from the precipitation tank 2, and the crystal cake of organic substances or both organic substances and inorganic substances is separated from the sodium aluminate solution by the filter 5.

The separated crystal cake is led through a conduit 6 to an automatic, continuous rated weigher 7 or a well known divider such as a simple divider, etc., whereby all the amount or a portion of the organic substances or both organic substances and inorganic substances newly precipitated on the seed crystals in the precipitation tank 2 is divided out and discharged through a conduit 8 or introduced into a causticization step (not shown in the drawing), where a chemical capable of reacting with the sodium oxalate or sodium salts of the inorganic substances to form insoluble substances can be added thereto, and the organic substances or both the organic substances and the inorganic substances in the solution can be made to precipitate as insoluble substances, and then separated and removed. As the chemical, limes such as quick limes, shaked lime, etc. can be generally used, but substances giving no adverse effect to the recyclic use in the Bayer process, for example, barium hydroxide, etc. can be also used.

The crystals of the organic substances or both the organic substances and the inorganic substances other than those divided out in the divider 7 and discharged through the conduit 8 are led to a dissolution tank 10 through a conduit 9.

The crystals of the organic substances or both the organic substances and inorganic substances introduced into the dissolution tank 10 are brought in contact with an aqueous unsaturated sodium oxalate solution introduced through a conduit 11 in such an amount as to recover the function as seed by contact of the crystals with the aqueous solution, in other words, to recover the precipitation rate of the organic substances in the sodium aluminate solution, prevent the generation of a large amount of fine sodium oxalate crystals grains and effect the dissolution to such a degree as not to disturb the balance of grain number of the seed crystals and also the weight balance, that is, in such an amount as to dissolve about 10–50% by weight of an amount of the organic substances newly precipitated on the seed crystals in the precipitation tank 2 (including the nuclearly generated sodium oxalate crystals).

In this case, the expression "about 10 to 50% by weight of the amount corresponding to the amount of organic substances newly precipitated on the seed crystals" to be dissolved in the dissolution tank 10 does not mean all the amount as just discharged from the precipitation tank 2, but means, for example, 0.7–3.3 parts by weight, if the amount of sodium oxalate crystals in the seeds introduced through the conduit 3 is 20 parts by weight, the amount of the organic substances in the entire precipitates from the conduit 4 is 30 parts by weight, and the amount discharged through the conduit 8 is 10 parts by weight as the amount of the organic substances.

As the aqueous unsaturated sodium oxalate solution to be introduced into the dissolution tank 10 through the conduit 11, for example, a dilute sodium aluminate solution unsaturated with sodium oxalate in the Bayer process or water is used, but the amount of the aqueous solution depends upon the desired amount of the organic substances to be dissolved, and the concentration of sodium oxalate in the aqueous solution to be used, and cannot be specifically defined, but the amount of the aqueous solution to be introduced can be simply determined by measuring said respective factors by simple analysis in advance and calculating the results.

A slurry consisting of the crystals and the aqueous solution containing the impurities resulting from the dissolution of the desired amount of the impurities in the dissolution tank 10 is introduced into the precipitation tank 2 through the conduit 3, and recyclically used as the seed crystals.

According to another embodiment of the present invention, the seed cake from the conduit 6 is not divided out, but led to the dissolution tank 10 through the conduit 9, and 10–50% by weight of the amount of the newly precipitated organic substances is dissolved therein. Then, the necessary amount of the slurry as the seed crystals is led to the precipitation tank 2 through the conduit 3, while the remaining portion is discharged to the outside of the system through the conduit 12. In that case, the amount to be dissolved, i.e. 10–50% by weight of the amount of the organic substances newly precipitated on the seed crystals in the dissolution tank 10 means, for example, 1–5 parts by weight, if the amount of sodium oxalate in the seed crystals introduced through the conduit 3 is 20 parts by weight and the amount of the organic substances in the entire precipitates from the conduit 4 is 30 parts by weight.

The slurry discharged to the outside of the system through the conduit 12 is treated in the same manner as the impurity cake discharged through the conduit 8.

According to other embodiment of the present invention, a portion of the amount corresponding to that of the newly precipitated impurities is discharged to the outside of the system through the conduit 8, while the remaining portion is led to the dissolution tank 10 through the conduit 9, and the desired amount of the impurities is dissolved in the aqueous solution from the conduit 11 to make a slurry. Then, a portion of the slurry is led as seed to the precipitation tank 2 through the conduit 3, whereas the remaining portion of the slurry is discharged to the outside of the system through the conduit 12.

According to the present invention, as described in detail above, the generation of sodium oxalate crystals having a fine grain size can be prevented in the removal of organic substances such as sodium oxalate, etc. in the sodium aluminate solution or in the simultaneous removal of the organic substances and inorganic substances of vanadium, phosphorus, etc., without lowering the function as seed of the organic substances or both the organic substances and the inorganic substances. In the conventional method, the lowering of the function as seed is quite inevitable.

Furthermore, even as compared with the conventional method for regenerating the crystals of organic substances, no such a large scale apparatus as used in the conventional method is required at all for washing, filtering and separating all the precipitated crystals of the organic substances, and also the amount of the organic substances newly precipitated on the seeds and to be discharged to the outside of the system can be confirmed by weight, and thus the operation is very simple, as compared with the well known washing-removal method of impurities.

Even if the concentration of sodium oxalate in the recycle sodium aluminate solution in the Bayer process is changed (a range in the change of the concentration of sodium oxalate at the inlet of the precipitation tank is usually within about 5 g/l), and consequently the amount of the organic substances or both the organic substances and the inorganic substances is more or less changed, the function of the recycle crystals as seed can be recovered, that is, the seed balance (as to the grain number of crystals and weight) can be maintained, so long as the average amount of precipitates is once calculated in the precipitation tank, and the amount of the impurities to be discharged to the outside of the system is predetermined. Accordingly, it is not necessary to change the amount of the organic substances to be washed and removed from the precipitated crystals from time to time in accordance with the concentration of sodium oxalate in the recycle sodium aluminate solution in the precipitation tank. Thus, the process for removing the impurities can be almost perpetually carried out without any lowering in the precipitation rate of impurities and without any addition of fresh crystals of the organic substances or both the organic substances and inorganic substances as seed from the outside of the system in contrast to the conventional method.

As seed for start-up, the seed generated in the process for the removal of the impurities can be used, because the seed is modified better within a short period of time. That is, it is not necessary to separately add the commercially available sodium oxalate crystals or sodium salt crystals of vanadium, phosphorus, etc. The shutdown and start-up can be easily carried out. Thus, the present method is quite economical.

When the impurities precipitated in the precipitation tank 2 are treated and again introduced therein through the conduit 3 as recycling seed according to the present invention, the amount of seed is presumed always constant in the foregoing description. In actual practice, however, it is, of course, possible to increase or decrease the amount of seed, so long as the seed balance is not disturbed in the precipitation tank.

The discharge of the newly precipitated impurities to the outside of the system from the conduit 8 can be carried out in any of batchwise, semi-continuous and continuous means, for example, in an intermittent way, etc.

The present invention will be described in detail below, referring to Examples, which will not be limitative of the present invention.

EXAMPLE 1

To 1 l of the spent liquor (sodium aluminate solution) containing 3.2 g/l of $Na_2C_2O_4$, 150 g/l of $Na_2O$, and 77 g/l of $Al_2O_3$ obtained by evaporating and cooling to 50° C. of the spent liquor resulting from digestion of bauxite and precipitation and separation of aluminum hydroxide therefrom according to the Bayer process (precipitate temperature: 60° C.) was added 5 g (dry basis) of crystals of organic substances (needle-like crystal, average diameter of crystal along the longitudinal axis: about 20 $\mu$m) obtained by natural cooling of the same spent liquor whose chemical composition is the same as described above, as seed, and the mixture was stirred for 2 hours. The crystals of organic substances were then separated by filtration, whereby 6.6 g (dry basis) of the crystals was obtained.

1.6 g of crystal corresponding to the newly precipitated amount was removed from the crystals of organic substances to be separated by filtration in advance, and the remaining 5 g of the crystals of organic substances was mixed with 15 ml of warm water, and stirred at a temperature of 50° C. for 30 minutes, whereby the organic substances in an amount corresponding to 20% by weight of the newly precipitated amount of the crystals were dissolved. The slurry thus obtained was added as seed to the fresh spent liquor of the same composition in the same amount as above, and subjected to the same treatment as above.

The foregoing procedure was repeated 20 times, and the concentration of $Na_2C_2O_4$ in the filtrate, filtration rate, and the average grain size of the crystals of organic substances along the longitudinal axis were measured when the crystals of organic substances were separated by filtration at the 1st, 5th, 10th, 15th and 20th runs. The results are shown in Table 1.

For comparison, said 5 g of the crystals of organic substances were treated in the same manner as above except that they were mixed with (i) 5 ml of warm water (corresponding to the amount to dissolve about 5% by weight of the amount of newly precipitated organic substances) and (ii) 40 ml of warm water (corresponding to the amount to dissolve about 80% by weight of the amount of newly precipitated organic substances). The concentration of $Na_2C_2O_4$ in the spent liquor, filtration rate, and the average grain size of the crystals of organic substances along the longitudinal axis after the respective runs were measured, and the results are also shown in Table 1.

As is evident from Table 1, especially from the concentration of $Na_2C_2O_4$ in the spent liquor after the respective runs, the average grain size is almost stable with a high filtration rate and without lowering the precipitation rate of the organic substances according to the present method, though the precipitated organic substances are periodically discharged as solid. That is, it is seen that an appropriate amount of the fine grains is generated so as to balance the number of seed crystals.

However, it is seen that in the case of Comparative Example (i), where the amount of the dissolved organic substances is less than 10% by weight, which is outside the scope of the present invention, a large amount of organic substance crystals having a fine grain size is generated, and the filtration rate is low, whereas in the case of Comparative Example (ii) where the amount of the dissolved organic substances is larger, it seems that fine grains are not generated at all or even if generated, they are dissolved, and consequently the grains of organic substance crystals become coarse and the balance of the number of seed crystals is disturbed, considerably lowering the precipitation rate.

TABLE 1

| | Example 1 | | | Comparative Example (I) | | | Compartive Example (II) | | |
|---|---|---|---|---|---|---|---|---|---|
| Runs | $Na_2C_2O_4$ concentration (g/l) | Average grain size (μm) | Filtration rate $m^3/m^2 \cdot hr$ | $Na_2C_2O_4$ concentration (g/l) | Average grain size (μm) | Filtration rate $m^3/m^2 \cdot hr$ | $Na_2C_2O_4$ concentration (g/l) | Average grain size (μm) | Filtration rate $m^3/m^2 \cdot hr$ |
| 1 | 1.6 | about 20 | 0.3 | 1.6 | about 20 | 0.2 | 1.6 | about 30 | 0.7 |
| 5 | 1.6 | about 30 | 0.7 | 1.6 | about 20 | 0.2 | 1.7 | about 40 | 0.8 |
| 10 | 1.6 | about 40 | 0.8 | 1.6 | about 20 | 0.2 | 2.0 | about 50 | 1.1 |
| 15 | 1.6 | about 40 | 0.8 | 1.6 | about 20 | 0.2 | 2.3 | about 60 | 1.3 |
| 20 | 1.6 | about 40 | 0.8 | 1.6 | about 20 | 0.2 | 2.5 | about 70 | 1.5 |

EXAMPLE 2

40 m³ of a recycle sodium aluminate solution containing 3.2 g/l of $Na_2C_2O_4$, 150 g/l of $Na_2O$, and 77 g/l of $Al_2O_3$ was placed in the precipitation tank 2 according to FIG. 1, and the seed sodium oxalate crystals (needle-like crystals, average size along the longitudinal axis: 30 μm) obtained in the same manner as in Example 1 was added thereto at a rate of 5 g/l through the conduit 3, and the mixture was stirred for 3 hours to effect precipitation.

After the precipitation, the resulting slurry was led to the filter 5 through the conduit 4, where the crystals of organic substances were separated from the sodium aluminate solution. The crystals of organic substances after the separation were led to the divider 7 through the conduit 6, where the crystals in the amount corresponding to the amount of the organic substances newly deposited on the seed crystals are divided out and discharged through the conduit 8, whereas the remaining portion of the crystals was led to the dissolution tank 10 through the conduit 9.

The amount of the crystals to be divided out in the divider 7 was set in view of the results of Example 1, that is, the fact that 6.6 g/l of the crystals were precipitated by the addition of 5 g/l of the seed crystals. In other words, it was set to lead 24% by weight of the amount of the crystals supplied through the conduit 6 to the conduit 8 [(6.6−5)/6.6=0.24], and the remaining 76% by weight of the crystals to the conduit 9 by division.

Warm water was led through the conduit 11 to the dissolution tank 10 at a rate of 0.15 m³/hr in the amount to dissolve an amount corresponding to 20% of the amount of the crystals newly precipitated in the precipitation tank 2 from the crystals placed in the dissolution tank 10, and mixed with stirring, and then the resulting slurry was continuously supplied to the precipitation tank 2 through the conduit 3 and used recyclically used therein as seed.

The recycle sodium aluminate solution from the Bayer process was continuously supplied at a rate of 10 m³/hr under the above-mentioned conditions through the conduit 1, and operation was continued for a duration of 20 days.

The concentration of $Na_2C_2O_4$ (g/l) in the recycling sodium aluminate solution supplied through the conduit 1, the concentration of $Na_2C_2O_4$ in the filtrate discharged from the filter 5, the concentration of solid in the precipitation tank, and the average grain size of the crystals were measured at intervals of 4 days. The results are shown in Table 2.

TABLE 2

| Days | $Na_2C_2O_4$ concentration in recycle sodium aluminate solution (g/l) | $Na_2C_2O_4$ concentration in filtrate (g/l) | Solid concentration in precipitation tank (g/l) | Average grain size of crystals (μm) |
|---|---|---|---|---|
| 4 | 3.3 | 1.7 | 6.7 | about 40 |
| 8 | 2.6 | 1.6 | 4.2 | about 55 |
| 12 | 2.4 | 1.7 | 3.0 | about 60 |
| 16 | 3.0 | 1.6 | 5.8 | about 50 |
| 20 | 3.3 | 1.6 | 7.1 | about 45 |

As is evident from Table 2, the amount of the organic substances newly precipitated on the seed sodium oxalate crystals was fluctuated between maximum 1.7 g/l and minimum 0.7 g/l according to the change in the concentration of $Na_2C_2O_4$ in the recycle sodium aluminate solution supplied through the conduit 1, but the concentration of $Na_2C_2O_4$ in the filtrate was almost constant, without any lowering of the precipitation rate and the filtration rate in the present invention, and thus it is seen that the present invention can provide a very distinguished method sufficiently corresponding to a change in the concentration of organic substances in the raw material or a change in operating conditions in the Bayer process.

Figure 2:
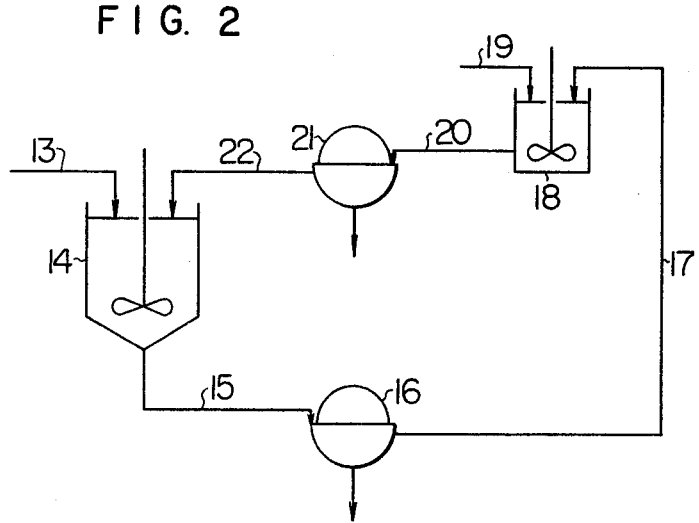
FIG. 2 is a flow sheet showing a mode of the conventional method used in Example 2 and comparative Example (V) of Example 5.

For comparison, continuous operation was carried out similarly according to a method of washing and removing all the amount of the organic substances newly precipitated on the seed crystals from the seed sodium oxalate crystals by washing. That is, as shown in FIG. 2, 40 m³ of a recycle sodium aluminate solution containing 3.2 g/l of $Na_2C_2O_4$, 150 g/l of $Na_2O$ and 77 g/l of $Al_2O_3$ was supplied to a precipitation tank 14 through a conduit 13, and seed sodium oxalate crystals (needle-like crystals, average size along the longitudinal direction: 30 μm) obtained in the same manner as in Example 1 was added thereto at a rate of 5 g/l through a conduit 22, and stirred for 3 hours to effect precipitation.

After the precipitation, the resulting slurry was led to a filter 16 through a conduit 15, where crystals of organic substances were separated from the sodium aluminate solution, and the crystals of organic substances after the separation were led to a dissolution tank 18 through a conduit 17, while warm water was led thereto through a conduit 19 at a rate of 0.5 m³/hr in an amount to dissolve the crystals corresponding to the amount of the organic substances newly precipitated on the seed crystals (that is, the amount of water to dissolve 1.6 g/l of the organic substances), and the mixture was stirred at 30° C. for about 30 minutes to dissolve the substantial amount of the organic substances newly precipitated on the seed crystals in the precipitation tank.

The slurry resulting from the dissolution treatment was led to a solid-liquid separator 21 through a conduit 20, where the seed sodium oxalate crystals were separated from a filtrate. The seed sodium oxalate crystals were added to the precipitation tank 14 through a conduit 22 and recyclically used therein as seed.

The recycle sodium aluminate solution from the Bayer process was continuously supplied at a rate of 10 m$^3$/hr through the conduit 13 under the above-mentioned conditions, and continuous operation was carried out while measuring the same items as above. The results are shown in Table 3.

After the start of operation, the concentration of $Na_2C_2O_4$ in the recycle sodium aluminate solution introduced through the conduit 13 was reduced on the 8th day, resulting in an excessive dissolution, and the amount of recycling seed crystals was decreased. As a result, the precipitation rate of organic impurities was considerably lowered, and thus the operation was continued by decreasing the rate of water for the dissolution to 0.3 m$^3$/hr.

Then, the concentration of solid in the precipitation tank 14 and the average grain size were recovered by an increase in the amount of the precipitated organic substances due to an increase in the concentration of $Na_2C_2O_4$ in the recycle sodium aluminate solution, but no increase in the precipitation rate was observed.

Microscopic observation of the seed revealed that the seed crystals consisted only of coarse grains.

On the assumption that these phenomena were due to the disturbance in the population balance of crystals caused by the excessive dissolution and the consequent disappearance of fine grains, the same seed as used at the start of operation were added thereto at a rate of 2 g/l on the 16th day after the start of operation, whereby the concentration of $Na_2C_2O_4$ in the filtrate was brought to 1.6 g/l, and the recovery of the precipitation rate was observed.

TABLE 3

| Days | $Na_2C_2O_4$ concentration in recycle sodium aluminate solution (g/l) | $Na_2C_2O_4$ concentration in filtrate (g/l) | Solid concentration in precipitation tank (g/l) | Average grain size of crystals (μm) |
|---|---|---|---|---|
| 4 | 3.4 | 1.6 | 7.0 | about 35 |
| 8 | 2.4 | 1.9 | 2.0 | about 25 |
| 12 | 3.2 | 2.0 | 4.5 | about 50 |
| 16 | 3.3 | 2.0 | 5.5 | about 70 |
| 20 | 3.1 | 1.6 | 8.0 | about 50 |

When the population balance of crystals is disturbed by the excessive washing in the method for washing and removing all the amount of organic substances newly precipitated on the seed by water from the seed sodium oxalate crystals, it is necessary to add fresh seed crystals from the outside of the system, whereas the present invention can provide a very effective method for the industrial scale practice without requiring any complicated technology of high level such as follow-up operation particularly for a fluctuation in the process, etc.

EXAMPLE 3

Operation was carried out in the same manner as in Example 1, except that 40 ml of a dilute sodium aluminate solution containing 0.3 g/l of $Na_2C_2O_4$, 15 g/l of $Na_2O$, and 10.3 g/l of $Al_2O_3$ obtained from the Bayer process was used for dissolving the crystals of organic substances in place of the warm water. The amount of the organic substances to be dissolved by the dilute sodium aluminate solution corresponded to 20% by weight of the amount newly precipitated on the seed crystals, and almost same results as the results of Example 1 were obtained as regards the precipitation rate and the filtration rate, as shown in Table 4.

TABLE 4

| Runs | $Na_2C_2O_4$ concentration (g/l) | Average grain size (μm) | Filtration rate (m$^3$/m$^2$ · hr) |
|---|---|---|---|
| 1 | 1.6 | about 20 | 0.3 |
| 5 | 1.7 | about 35 | 0.7 |
| 10 | 1.6 | about 40 | 0.8 |
| 15 | 1.6 | about 40 | 0.8 |
| 20 | 1.6 | about 40 | 0.8 |

EXAMPLE 4

To 1 l of the spent liquor containing 150 g/l of $Na_2O$, 77 g/l of $Al_2O_3$, 3.2 g/l of $Na_2C_2O_4$, 0.38 g/l of V, and 0.19 g/l of P, obtained by evaporating and then cooling to 50° C. of the spent liquor resulting from the digestion of bauxite and successive precipitation and separation of aluminum hydroxide according to the Bayer process (precipitation temperature: 60° C.) were added 5 g (dry basis) of crystals of organic substances (needle-like crystals, average size of the crystals along the longitudinal axis: 20 μm) obtained by cooling the spent liquor whose chemical composition is same as described above, and crystals of sodium salts of inorganic substances containing 2 g of 2 $Na_3VO_4$.NaF.19 $H_2O$ and 1.6 g of 2 $Na_3$.$PO_4$.NaF.19 $H_2O$, as seed, and the resulting mixture was stirred for 2 hours. The precipitates were separated by filtration, whereby 6.6 g (dry basis) of crystals of organic substances and 4.6 g (dry basis) of inorganic substances were obtained. From the resulting crystals were removed 2.6 g (dry basis, 1.6 g of the organic substances and 1.0 g of the inorganic substances) corresponding to the total amount of the newly precipitated impurities in advance, whereas the remaining 8.6 g of the crystals was mixed with 20 ml of warm water and stirred at a temperature of 50° C. for 30 minutes to dissolve the organic substances in an amount corresponding to 20% by weight of the amount of the organic substances newly precipitated on the seed crystals. The slurry thus obtained was added as seed to the same amount of the same spent liquor as above and subjected to the same treatment as above.

The operation was repeated 20 times, and the concentration of $Na_2C_2O_4$ and the concentrations of V and P in the filtrate, the filtration rate and the average grain size of the crystals of organic substances along the longitudinal axis were measured at 1st, 5th, 10th, 15th and 20th runs of separation of crystals by filtration. The results are shown in Table 4.

For comparison, the operation was carried out in the same manner as above, except that the same amount of the same crystals as above was mixed with (iii) 10 ml of warm water (corresponding to the amount to dissolve about 5% by weight of the amount of the newly precipitated organic substances) and (iv) 45 ml of warm water (corresponding to the amount to dissolve about 80% by weight of the amount of newly precipitated organic substances). The concentration of $Na_2C_2O_4$ and the concentrations of P and V in the filterate of finishing slurry, the filtration rate, and the average grain size of the crystals of organic substances along the longitudinal axis after the treatment are shown in Table 4.

As is evident from Table 4, especially the concentration of $Na_2C_2O_4$ and the concentrations of V and P in the filtrate after the treatment, a good filtrability can be obtained without lowering the precipitation rate of the organic substances and the inorganic substances, and furthermore the average grain sizes are almost stable, though the precipitated organic substances and inorganic substances are periodically discharged as solid, and thus it is seen that an appropriate amount of fine grains is generated so as to maintain the balance of number of seed grains.

On the other hand, in the case of Comparative Example (iii) where the amount of the organic substances to be dissolved is less than 10% by weight, which is outside the range of the present invention, a large amount of organic substances crystals having a fine grain size is generated, though the precipitation rate of the organic substances and inorganic substances is not lowered, and also the filtration rate is low, whereas in the case of Comparative Example (iv) where the amount to be dissolved is larger, the grains become coarse as to the organic substances and the balance of the number of seed grains is disturbed, because it seems that the fine grains are not generated at all or even if the grains are generated, they are dissolved soon, and consequently, it is seen that the function as seed is lowered, and the precipitation rate is also considerably lowered, though the precipitation rate is not substantially changed as to the inorganic substances.

vider 7 through the conduit 6, where the crystals in the amount corresponding to the amount of the organic substances and inorganic substances newly precipitated on the seed crystals were divided out, and discharged through the conduit 8, whereas the remaining portion of the crystals was led to the dissolution tank 10 through the conduit 9.

The predetermination of the amount to be divided out in the devider 7 was made in view of the results of Example 4, that is, the fact that 11.2 g/l of the crystals were precipitated by the addition of 8.6 g/l of the total of the seeds, and thus it was set to lead 23% by weight of the amount of the crystals to be supplied through the conduit 6 to the conduit 8 [11.2−8.6/11.2=0.23] and the remaining 77% by weight thereof to the conduit 9 by division.

Warm water was led through the conduit 11 to the dissolution tank 10 at a rate of 0.2 m³/hr in the amount to dissolve an amount corresponding to 20% of the amount of the crystals newly precipitated on the seed crystals in the precipitation tank 2 from the crystals placed in the dissolution tank 10, and mixed and stirred at 50° C., and the resulting slurry was continuously supplied to the precipitation tank 2 together with the solution, and recyclically used as the seed.

The recycle sodium aluminate solution from the Bayer process was continuously supplied through the conduit 1 at a rate of 10 m³/hr under the above-mentioned conditions, and operation was continued for a

TABLE 4

| | Example 4 | | | | | Comparative Example (iii) | | |
|---|---|---|---|---|---|---|---|---|
| | Concentration in filtrate (g/l) | | | Average grain size of organic substance | Filtration rate | Concentration in filtrate (g/l) | | |
| Runs | $Na_2C_2O_4$ | V | P | (μm) | (m³/m² · hr) | $Na_2C_2O_4$ | V | P |
| 1 | 1.6 | 0.30 | 0.15 | about 20 | 0.3 | 1.6 | 0.29 | 0.15 |
| 5 | 1.6 | 0.29 | 0.16 | about 30 | 0.7 | 1.6 | 0.30 | 0.15 |
| 10 | 1.6 | 0.30 | 0.15 | about 40 | 0.8 | 1.6 | 0.30 | 0.16 |
| 15 | 1.6 | 0.30 | 0.16 | about 40 | 0.8 | 1.6 | 0.30 | 0.15 |
| 20 | 1.6 | 0.29 | 0.15 | about 40 | 0.8 | 1.6 | 0.29 | 0.16 |

| | | | | | Comparative Example (iv) | | |
|---|---|---|---|---|---|---|---|
| | Average grain size of organic substance | Filtration rate | Concentration in filtrate (g/l) | | | Average grain size of organic substance | Filtration rate |
| Runs | (μm) | (m³/m² · hr) | $Na_2C_2O_4$ | V | P | (μm) | (m³/m² · hr) |
| 1 | about 20 | 0.2 | 1.6 | 0.30 | 0.15 | about 30 | 0.7 |
| 5 | about 20 | 0.2 | 1.8 | 0.30 | 0.16 | about 40 | 0.8 |
| 10 | about 20 | 0.2 | 2.0 | 0.29 | 0.15 | about 50 | 1.2 |
| 15 | about 20 | 0.2 | 2.2 | 0.30 | 0.15 | about 60 | 1.2 |
| 20 | about 20 | 0.2 | 2.5 | 0.29 | 0.15 | about 70 | 1.5 |

EXAMPLE 5

40 m³ (50° C.) of a recycle sodium aluminate solution containing 3.2 g/l of $Na_2C_2O_4$, 0.38 g/l of V, 0.19 g/l of P, 150 g/l of $Na_2O$ and 77 g/l of $Al_2O_3$ was placed in the precipitation tank 2 according to FIG. 1, and the seed sodium oxalate crystals and seed crystals of inorganic substances as used in Example 4 were added thereto at a rate of 5 g/l and 3.6 g/l (dry basis), respectively, through the conduit 3, and stirred for 3 hours to effect precipitation.

After the precipitation, the slurry was led to the filter 5 through the conduit 4, where the crystals of organic substances and inorganic substances were separated from the sodium aluminate solution, and the crystals of the impurities after the separation were led to the diduration of 10 days.

The concentrations of $Na_2C_2O_4$, V and P (g/l) in the recycle sodium aluminate solution supplied through the conduit 1, the concentrations of $Na_2C_2O_4$, V and P (g/l) in the filtrate discharged from the filter 5, the concentration of solid in the precipitation tank, and the average grain size of the crystals of organic substances were measured at intervals of 2 days during the operation. The results are shown in Table 5.

For comparison, continuous operation was also carried out in the method for washing and removing all the amount of the organic substances newly precipitated on the seed crystals by water from the seed sodium oxalate crystals. That is, 40 m³ of a recycle sodium aluminate solution containing 3.2 g/l of $Na_2C_2O_4$, 0.38 g/l of V, 0.19 g/l of P, 150 g/l of $Na_2O$ and 77 g/l of $Al_2O_3$ was supplied to the precipitation tank 14 through the conduit 13 according to FIG. 2, and the sodium oxalate crystals and the crystals of inorganic substances as used in Example 4 were added at rates of 5 g/l and 3.6 g/l (dry basis), respectively, through the conduit 22, and stirred for 3 hours to effect precipitation.

After the precipitation, the resulting slurry was led to the filter 16 through the conduit 15, where the crystals of the organic substances and the inorganic substances were separated from the sodium aluminate solution, and the crystals resulting from the separation were led to the dissolution tank 18 through the conduit 17, while warm water was introduced into the dissolution tank through the conduit 19 at a rate of 0.7 m³/hr in an amount to dissolve the crystals corresponding to the amount of the organic substances newly precipitated on the seed crystals (the amount of water to dissolve 1.6 g/l thereof). The mixture was stirred at 50° C. for about 30 minutes, whereby the substantial amount of the organic substances newly precipitated on the seed crystals in the precipitation tank 14 was dissolved.

The slurry resulting from the dissolution treatment was led to the solid-liquid separator 21 through the conduit 20, where the seed crystals were separated from a filtrate. The seed crystals were added to the precipitation tank 14 through the conduit 22 and recyclically used as seed.

10 m³/hr of the recycle sodium aluminate solution from the Bayer process was continuously supplied through the conduit 13 under the above-mentioned conditions, and continuous operation was carried out while measuring the same items as above. The results are shown in Table 5 as Comparative Example (V).

As is evident from Table 5, the present invention can provide a very distinguished method for simultaneously and continuously removing the organic substances and the inorganic substances with a high filtration rate without lowering the function as seed as regards both the organic substances and the inorganic substances while maintaining the concentrations of $Na_2C_2O_4$, V, and P in the filtrate constant. In the method for washing and removing all the amount of the organic substances newly precipitated on the seed crystals by water as shown in Comparative Example (V), on the other hand, the lowering of the function as seed as regards the organic substances does not take place at all, and is kept constant as is evident from the change in the concentrations of $Na_2C_2O_4$, V and P in the filtrate, but the function as seed as regards the inorganic substances is gradually lowered, and no precipitation takes place at all on the 4th day. When the same crystals of inorganic substances as used at the start of the operation is added thereto at a rate of 3.6 g/l on the 6th day, the concentrations of V and P in the filtrate are returned to those at the start of the operation, and the recovery of the precipitation rate is observed.

However, similar phenomena again appear in the successive operation. As a result of analysis of the seed crystals, it is found that there are no crystals of inorganic substances on the 4th and 10th days, but only the crystals of the organic substances exist. This is due to the difference in solubility in washing water between the organic substances and the inorganic substances, and the solubility of the crystals of inorganic substances is almost twice that of the crystals of organic substances under the conditions of Comparative Example (V), and consequently the crystals of inorganic substances are excessively washed. That is, there are no crystals of the inorganic substances at all in the seed. This is the cause for such phenomena.

In the method for washing and removing all the amount of the organic substances newly precipitated on the seed crystals by water, an excessive dissolution prevails if there is a difference in compositions of the organic substances and the inorganic substances between the precipitates and the washing solution, and it is necessary to supplement fresh seed crystals from the outside of the system, whereas in the present method, the functions as seed as regards the organic substances and the inorganic substances can be maintained, independently of their compositions, and no complicated technique of high level is required in the industrial scale application. Thus, the present method is very effective in these respects.

TABLE 5

| | Example 5 | | | | | | | |
|---|---|---|---|---|---|---|---|---|
| | Concentration in initial solution (g/l) | | | Concentration in filtrate (g/l) | | | Solid concentration in precipitation tank (g/l) | Grain size of crystals of organic substances (μm) |
| Days | $Na_2C_2O_4$ | V | P | $Na_2C_2O_4$ | V | P | | |
| 1 | 3.2 | 0.39 | 0.19 | 1.6 | 0.30 | 0.15 | 11.7 | about 20 |
| 2 | 3.0 | 0.38 | 0.20 | 1.7 | 0.29 | 0.15 | 11.2 | about 30 |
| 4 | 3.1 | 0.38 | 0.19 | 1.6 | 0.29 | 0.16 | 10.7 | about 40 |
| 6 | 3.2 | 0.37 | 0.22 | 1.7 | 0.30 | 0.15 | 11.0 | about 45 |
| 8 | 3.3 | 0.38 | 0.19 | 1.6 | 0.30 | 0.14 | 11.7 | about 40 |
| 10 | 3.1 | 0.38 | 0.19 | 1.6 | 0.30 | 0.15 | 11.2 | about 40 |
| | Comparative Example (V) | | | | | | | |
| | Concentration in initial solution (g/l) | | | Concentration in filtrate (g/l) | | | Solid concentration in precipitation tank (g/l) | Grain size of crystals of organic substances (μm) |
| Days | $Na_2C_2O_4$ | V | P | $Na_2C_2O_4$ | V | P | | |
| 1 | 3.1 | 0.38 | 0.20 | 1.7 | 0.30 | 0.15 | 9.9 | about 25 |
| 2 | 3.2 | 0.38 | 0.19 | 1.6 | 0.34 | 0.17 | 7.6 | about 35 |
| 4 | 3.3 | 0.39 | 0.19 | 1.7 | 0.38 | 0.19 | 6.5 | about 40 |
| 6 | 3.0 | 0.38 | 0.18 | 1.6 | 0.29 | 0.15 | 10.8 | about 45 |
| 8 | 3.2 | 0.39 | 0.19 | 1.6 | 0.35 | 0.17 | 7.2 | about 40 |
| 10 | 3.2 | 0.38 | 0.21 | 1.6 | 0.38 | 0.21 | 6.7 | about 45 |

EXAMPLE 6

Operation was carried out in the same manner as in Example 4, except that 25 ml of a dilute sodium aluminate solution containing 0.3 g/l of $Na_2C_2O_4$, 15 g/l of $Na_2O$ and 10.3 g/l of $Al_2O_3$, obtained from the Bayer process was used in place of the warm water used for dissolving a portion of the seed crystals. The amount of the organic substances dissolved from the crystals by the dilute sodium aluminate solutiohn was that corresponding to 20% by weight of the amount newly precipitated on the seed crystals. Almost the same results as in Example 4 were obtained, as shown in Table 6 together with the precipitation rate and the filtration rate.

TABLE 6

| Run | Concentration in filtrate (g/l) | | | Average grain size of organic substrances ($\mu m$) | Filtration rate ($m^3/m^2 \cdot Hr$) |
| --- | --- | --- | --- | --- | --- |
| | $Na_2C_2O_4$ | V | P | | |
| 1 | 1.6 | 0.29 | 0.15 | about 20 | 0.3 |
| 5 | 1.6 | 0.30 | 0.16 | about 30 | 0.7 |
| 10 | 1.6 | 0.30 | 0.16 | about 40 | 0.8 |
| 15 | 1.6 | 0.29 | 0.15 | about 45 | 0.9 |
| 20 | 1.6 | 0.30 | 0.15 | about 40 | 0.8 |

What is claimed is:

1. A method for the removal of impurities from a sodium aluminate solution in the production of alumina from bauxite in accordance with the Bayer process or improved processes thereof, characterized by adding sodium oxalate crystals or both sodium oxalate crystals and at least one sodium salt of elements selected from vanadium and phosphorus, or double salts containing said sodium salts of elements selected from vanadium and phosphorus as seed to a sodium aluminate solution during the time period extending from after the precipitation step to before the digestion step, thereby precipitating crystals of organic substances or both crystals of organic substances and crystals of inorganic sodium salts of vanadium and phosphorus as impurities in the sodium aluminate solution; separating the crystals from the sodium aluminate solution; dissolving about 10 to 50% by weight of an amount corresponding to the amount of the newly precipitated organic substances from the separated crystals in an aqueous unsaturated sodium oxalate solution; and then recyclically using the crystals resulting from the dissolution together with the resulting solution as seed for the precipitation of the organic substances or both the organic substances and the inorganic substances in the sodium aluminate solution.

2. A method for the removal of impurities from a sodium aluminate solution in the production of alumina from bauxite in accordance with the Bayer process or improved process thereof, characterized by adding sodium oxalate crystals or both sodium oxalate crystals and at least one sodium salt of elements selected from vanadium and phosphorus, or double salts containing said sodium salts of elements selected from vanadium and phosphorus as seed to an sodium aluminate solution during the time period extending from after the precipitation step to before the digestion step, thereby precipitating crystals of organic substances or both crystals of organic substances and crystals of inorganic sodium salts of vanadium and phosphorus as impurities in the sodium aluminate solution; separating the crystals from the sodium aluminate solution; separating and removing a portion or all an amount corresponding to the amount of newly precipitated crystals as a solid from the separated crystals; then dissolving about 10 to 50% by weight of the amount corresponding to the amount of organic substances newly precipitated on the seed from the remaining crystals in an aqueous unsaturated sodium oxalate solution; and recyclically using a predetermined amount of the crystals resulting from the dissolution together with the resulting solution as seed for the precipitation of the organic substances or both the organic substances and the inorganic substances in the sodium aluminate solution.

3. A method for the removal of impurities from a sodium aluminate solution in the production of alumina from bauxite in accordance with the Bayer process or improved processes thereof, characterized by adding sodium oxalate crystals or both sodium oxalate crystals and at least one sodium salt of elements selected from vanadium and phosphorus, or double salts containing said sodium salts of elements selected from vanadium and phosphorus as seed to a sodium aluminate solution during the time period extending from after the precipitation step to before the digestion step, thereby precipitating crystals of organic substances or both crystals of organic substances and crystals of inorganic sodium salts of vanadium and phosphorus as impurities in the sodium aluminate solution; separating the crystals from the sodium aluminate solution; mixing the separated crystals with an aqueous unsaturated sodium oxalate solution in an amount to dissolve about 10 to 50% by weight of the amount corresponding to an amount of the organic substances newly precipitated on the seed crystals, thereby making a slurry; and recyclically using the necessary amount of the slurry for the seed.

4. A method according to any one of claims 1 to 3, wherein the precipitation treatment of impurities is carried out at a temperature of from 0° C. to 75° C.

5. A method according to any one of claims 1 to 3, wherein the amount of the addition of seed sodium oxalate crystals is about 30 to 3,000% by weight on the basis of the amount of sodium oxalate dissolved in said sodium aluminate solution.

6. A method according to any one of claims 1 to 3, wherein the amount of the addition of inorganic seed is 50 to 50,000% by weight on the basis of total amount of the vanadium and phosphorus dissolved in said sodium aluminate solution.

7. A method according to any one of claims 1 to 3, wherein the sodium aluminate solution after the addition of the seed crystals is stirred for 30 minutes to 10 hours.

8. A method according to any one of claims 1 to 3, wherein the dissolution treatment of separated crystals from said sodium aluminate solution is carried out at a temperature of not higher than 100° C.

9. A method according to any one of claims 1 to 3, wherein the aqueous unsaturated sodium oxalate solution is water.

10. A method according to any one of claims 1 to 3, wherein the aqueous unsaturated sodium oxalate solution is a dilute sodium aluminate solution unsaturated with sodium oxalate in the Bayer process.

* * * * *